(12) United States Patent
Owens et al.

(10) Patent No.: US 7,593,859 B1
(45) Date of Patent: Sep. 22, 2009

(54) SYSTEM AND METHOD FOR OPERATIONAL RISK ASSESSMENT AND CONTROL

(75) Inventors: Jennifer B. Owens, Charlotte, NC (US); Jacob Firestone, Martinez, CA (US); Edward T. Hawthorne, Fairfield, CA (US); Joseph L Valasquez, Charlotte, NC (US); David Hadd, Charlotte, NC (US); Bradley A. Yee, South San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 1097 days.

(21) Appl. No.: 10/605,551

(22) Filed: Oct. 8, 2003

(51) Int. Cl.
G06F 17/50 (2006.01)
(52) U.S. Cl. .................................................. 705/7
(58) Field of Classification Search .................. 705/7
See application file for complete search history.

(56) References Cited

U.S. PATENT DOCUMENTS

| | | | | |
|---|---|---|---|---|
| 5,586,252 | A * | 12/1996 | Barnard et al. | 714/48 |
| 7,409,357 | B2 * | 8/2008 | Schaf et al. | 705/7 |
| 2003/0149657 | A1 * | 8/2003 | Reynolds et al. | 705/38 |
| 2004/0059589 | A1 * | 3/2004 | Moore et al. | 705/1 |

OTHER PUBLICATIONS

Chakib et al "Effect Failure Mode and Effect Analysis Package", 1992, pp. 414-421.*

V-Car "A Fuzzy approach to construction project risk assessment and analysis: Construction project risk management system", Oct. 1999, Project Systems Engineering Reserch Unit. pp. 1-17.*
Joanna Risk analysis techniques and their application to software deveopment.*
Yacoub "A Methodology for Architectural-Level Risk Assessment Using Dynamic Metrics", Dec. 2000, Proceedings of the 11th International Symposium on Software Reliability Engineering (ISSRE'00).*
Beroggi et al (Operational Risk Management : A New Paradigm for Decision Making), Dec. 1994, IEEE Transaction on Systems, Man and Cybernetics, pp. 1-8.*
V.Car ( A fuzzy approach to construction project risk assessment and analysis: construction project risk management system), Nov. 2001, Advances in Engineering software vol. 32, issues 10-11, pp. 847-857.*

(Continued)

*Primary Examiner*—Romain Jeanty
(74) *Attorney, Agent, or Firm*—Steven B. Phillips; R. Brian Drozd; Michael A. Springs

(57) ABSTRACT

System and method for operational risk assessment and control. The present invention, in disclosed, example embodiments provides systems and methods to facilitate risk assessment, prioritization, mitigation and control activities. Various modules work together to accomplish risk assessment, prioritization, mitigation and stability tracking. The modules can be implemented by a computer system or systems, software and networks, or by other means, such as paper-based means. In some embodiments, operational risk management and control begins with an assessment for one or more functions of the organization involved. This assessment includes identifying failure modes, causes and effects, which are permuted to define risk items. A risk prioritization report is produced which prioritizes the risk items based at least in part on the ratings associated with the causes and effects, and a mitigation plan can be put in place.

39 Claims, 11 Drawing Sheets

OTHER PUBLICATIONS

Chang et al (Failure mode and effects analysis using grey theory), Dec. 2001, Integrated Manufacturing Systems vol. 12 Issue: 3 p. 211-216.*

Feather et al (Combining the best attributes of qualitative and quantitative riskmanagement tool support), Dec. 2000, IEEE, pp. 309-312.*

Greenfield (Risk management tools), May 2000, Langley Research Center, pp. 1-27.*

Alexander Carol (Bayesian Methods for Measuring Operational Risk Discussion Papers in Finance Feb. 2000, ISMA Centre, pp. 1-22.*

Valentine, D., *Risk Management: A Tactical Guide*, Celent Communications, (Sep. 2003).

* cited by examiner

FIG. 5

Failure Mode:
Any way in which a particular event or task that is critical to the delivery of a core function fails to execute or complete successfully

{ 502

| Organization | Function/ Delivery Process | Activity or Process Event | Failure Modes | Overall FM OCC | Overall FM DET |
|---|---|---|---|---|---|
|  |  |  |  |  |  |
|  |  |  |  |  |  |
|  |  |  |  |  |  |
|  |  |  |  |  |  |
|  |  |  |  |  |  |
|  |  |  |  |  |  |

| Function/ Delivery Process | Failure Modes | Activity or Process Event | Customer, Delivery Partner and Unit Effects ( one per line) | Compliance Concern? | If Compliance= Y, Which Regulations or Laws? | Strategic Plan Related? | Scoring | |
|---|---|---|---|---|---|---|---|---|
| | | | | | | | SEV RATING | RESP RATING |
| | | | | Y/N | | Y/N | | |
| | | | | | | | | |
| | | | | | | | | |
| | | | | | | | | |
| | | | | | | | | |
| ↑ 604 | ↑ 606 | ↑ 608 | ↑ 610 | ↑ 612 | ↑ 614 | ↑ 616 | ↑ 618 | ↑ 620 |

602 { Risk Effects: Impacts the failure mode potentially has on the unit being assessed, or customers or delivery partners served by each function

| Function | Process | Failure | Effect | Causes | Controls | SEV | OCC | Criticality | DET | RPN | RESP | Adjusted Criticality |
|---|---|---|---|---|---|---|---|---|---|---|---|---|
| ←802 | ←804 | ←806 | ←808 | ←810 | ←812 | | | | | | | |

800

814 { SEV, OCC, Criticality, DET, RPN, RESP, Adjusted Criticality }

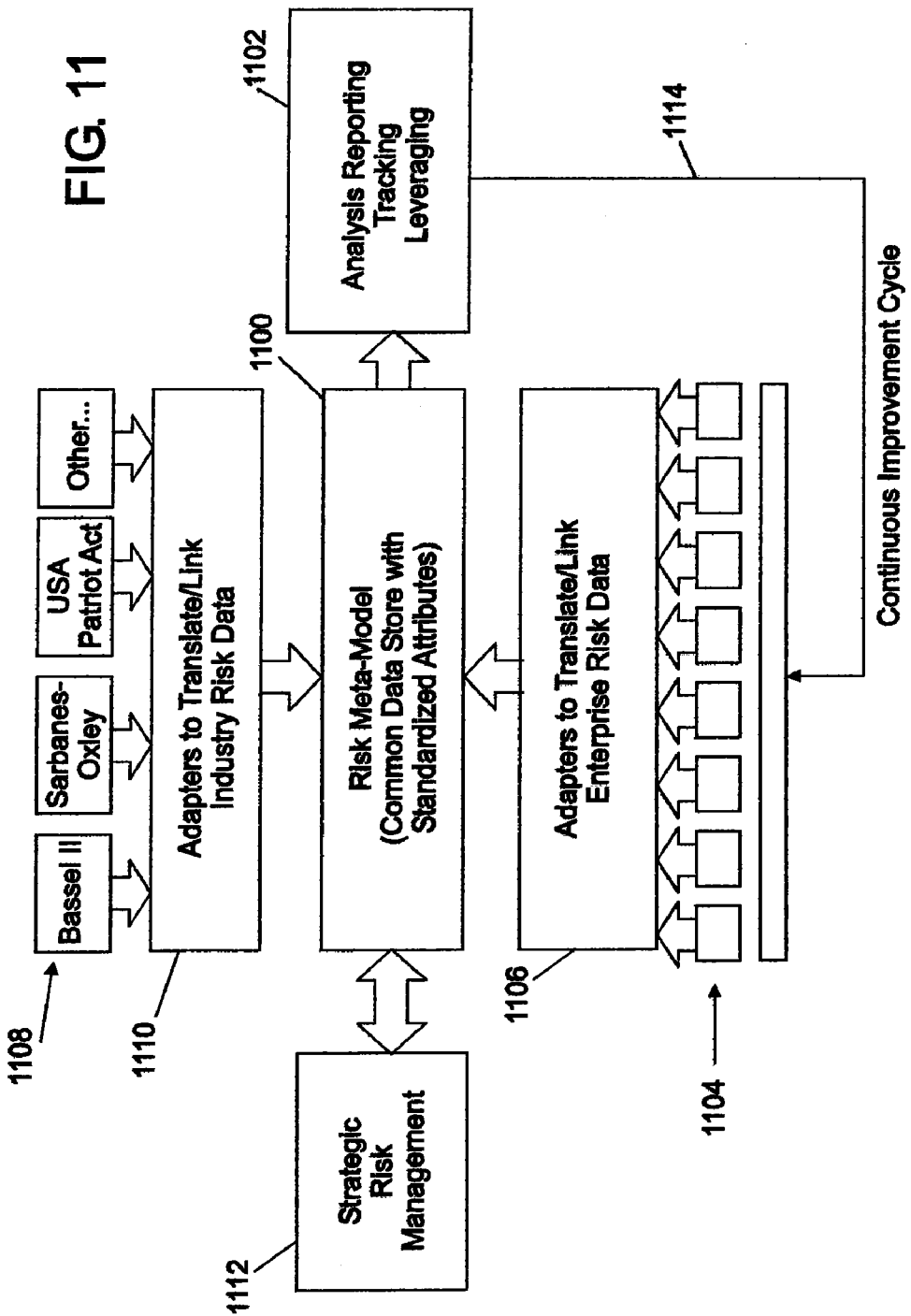

SYSTEM AND METHOD FOR OPERATIONAL RISK ASSESSMENT AND CONTROL

BACKGROUND OF INVENTION

Today, many businesses must deal with complex operational models which present many varied types of operational risks. In addition to the normal business risks, increasing privacy related regulations and ethics rules must be complied with by businesses. Regardless of the source of operational risk, responsibility for failing to deal with operational risk is often placed on the board of directors or other executives of an institution or organization. There is an increasing need for comprehensive governance process to assure operational risk is managed appropriately across an entire business organization. For very large and geographically diverse organizations, these requirements can create significant challenges and cause significant resource expenditure.

Historically, efforts to accomplish operational risk assessment, management, and control have centered around separate systems, often based largely on individual, subjective judgements of management personnel and others responsible for risk management in an organization. Sometimes these efforts lack currency and are not adequately monitored and tracked over time. Therefore, there is a need for an integrated process and system for efficiently assessing risk and monitoring mitigation activities.

SUMMARY OF INVENTION

This invention provides tools and systems to facilitate operational risk assessment, prioritization, mitigation and control activities, and the tracking of all of the above, in an organization or enterprise. In some embodiments, risk assessment activities can be used to create a risk meta-model, which characterizes various risks in a consistent way across an organization. In some embodiments, the invention may be attractive to organizations where operational risk assessment, prioritization, and mitigation activities are monitored across a large enterprise through a central governance process. However, the principles of the invention can be applied to small businesses, non-profit organizations, volunteer and educational organizations, partnerships, and any other organization of any size.

The invention in some embodiments can facilitate defining risk using a consistent approach (i.e. characterizing risks in terms of failure, cause and effect). This consistent approach can allow managers in an organization or enterprise to consistently apply the risk process and share and integrate the results of the application of the process with other managers.

In some embodiments, the system of the invention includes various modules that work together to accomplish risk assessment, prioritization, and mitigation tracking. These modules make use of various data stores or databases, at various points in their operations. The modules and databases can be implemented by a computer system or systems, software and networks, or by other means, such as paper-based means. A combination of instrumentalities can be used, for example, paper based lists and assessments which are then entered into a spread sheet or similar computer program for easy calculation. The fundamental principles of operation of the invention as illustrated by the embodiments disclosed herein, remain unchanged regardless of the means of implementing the systems and methods described.

In some embodiments, operational risk management and control begins with an assessment for one or more functions of the organization involved. This assessment begins by identifying failure modes for the function. At least one cause and at least one effect are identified for each failure mode. Ratings associated with each of the causes and effects are gathered, as provided by subject matter experts, management personnel, or any other individuals involved in the assessment. Failure modes, causes, and effects are permuted to define at least two, and usually more, risk items. In some cases, a large number of risk items can be defined. Finally, a risk prioritization report is produced which prioritizes the risk items based at least in part on the ratings associated with the causes and effects. In some embodiments, a mitigation plan can be put in place for the various risks identified, and the mitigation plan can be tracked to assist management in controlling the risks identified. Additionally, in some embodiments, stability analysis can be enabled by determining stability, which can be a ratio comparing the number of priority risk items to a total number of risk items for an organization, enterprise, etc.

The ratings acquired for each effect can include a severity rating and a response rating. The ratings acquired for each cause can include an occurrence rating and a detection rating. Prioritization can be based on a criticality, which is calculated from the severity rating and the occurrence rating associated with each risk item. Prioritization or other information can also be determined from a risk priority number which is calculated from the severity rating, the occurrence rating, and the detection rating, and/or an adjusted criticality which is calculated based on the criticality, the severity rating, and the response rating. Whether a risk item is related to regulatory compliance, strategic planning, a hidden factory, or a tail event can also be considered. In some embodiments, failure mode likelihoods associated with each failure mode can be used to validate the ratings of the causes and effects, and the risk items that include those causes and effects. Data can also be validated by comparison with historical data. Additionally, in some embodiments, items in the risk prioritization report can be quantified based on financial data.

As previously mentioned, paper based or other manual means, computer based means, or a combination of the two can be used to implement the methods and systems of the invention. In some embodiments, analysis modules can be used to identify causes and effects associated with failure modes of a function in an organization. At least one data store is operationally connected to at least some of the analysis modules. In the case of paper based means, the data store may simply be lists of ratings and calculated results. In a combination paper/computer embodiment, the data store may be a spread sheet or database, but items are input from paper, or manually. In either case, references herein to items being "operationally connected" or the like are intended to encompass all such possibilities. In example embodiments, a calculation module can be operationally connected to the other modules to permute the various failure modes, causes and effects to define the risk items. This permuting can include defining all possible permutations of the various causes, effects and failure modes. In some embodiments, the risk calculation module produces a risk prioritization report of the risk items. Any prioritization displayed in the report can be based, at least in part, on the various cause and effect, and failure mode ratings which have been gathered and associated with risk items.

In some embodiments, the invention is implemented via computing platform or a collection of computing platforms interconnected by a network, such as corporate Intranet, in which case a web browser can facilitate use of the invention. A computer program product or products containing computer programs with various instructions cause the hardware to carry out, at least in part, the methods of the invention.

Modules are operated on a server or workstation. Data stores or databases are operatively connected to the modules. Such data stores can reside on the same platform as the various modules or they can reside on a database server connected over a network.

BRIEF DESCRIPTION OF DRAWINGS

FIG. 5 illustrates a failure mode worksheet or entry form according to some embodiments of the present invention.

FIG. 6 shows an effects worksheet or entry form according to some embodiments of the invention.

FIG. 8 illustrates the format of a risk prioritization report according to some embodiments of the present invention.

FIG. 11 is a combination block and flow diagram which shows how the risk assessment and management activities of some embodiments of the invention can be used to assist in the creation of a risk meta-model for an enterprise.

DETAILED DESCRIPTION

Figure 1:
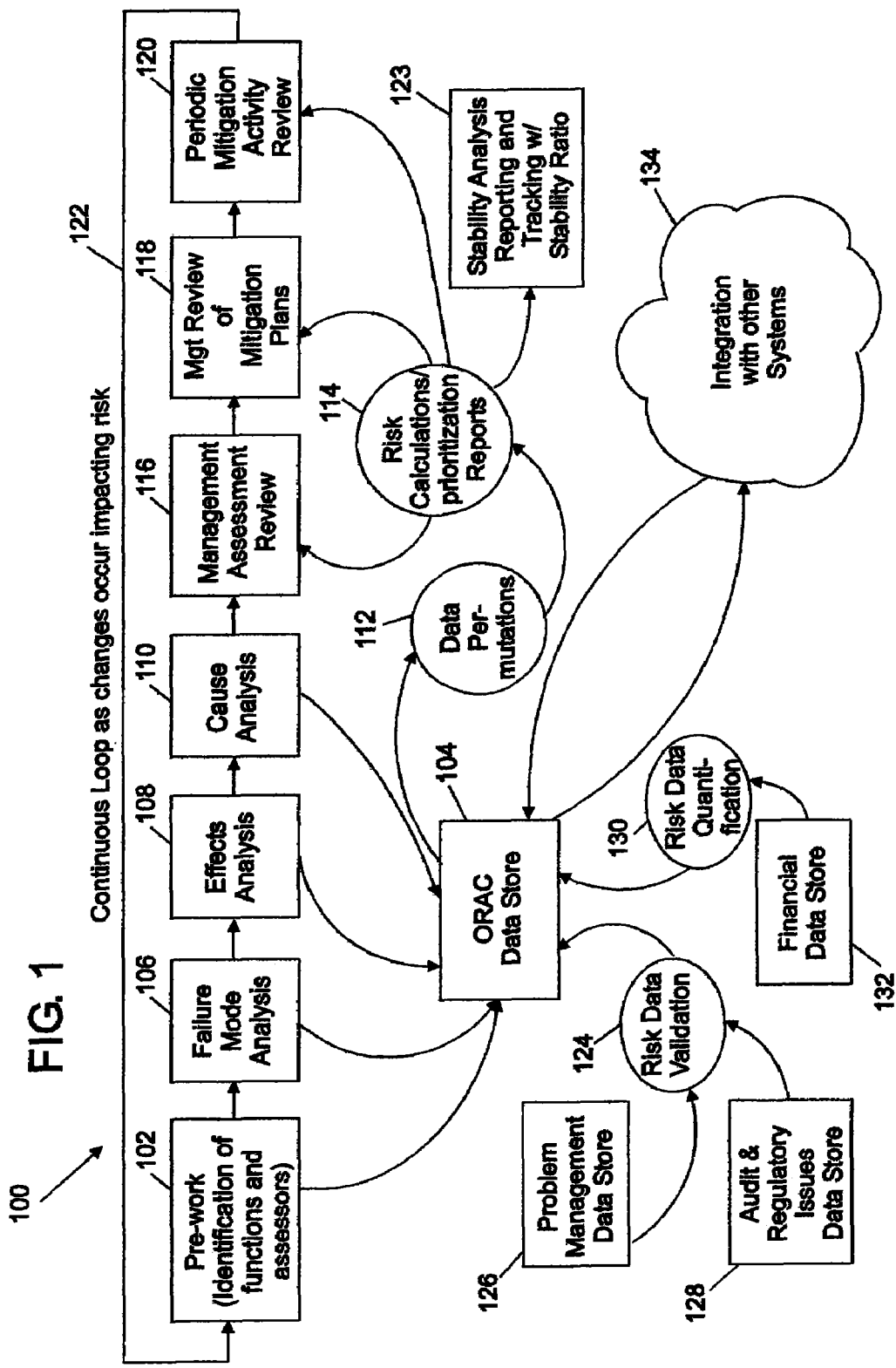
FIG. 1 is a combination object and flow diagram which illustrates a system according to some embodiments of the invention.

The present invention can most readily be understood by considering the detailed embodiments presented herein. Some of the embodiments are presented in the context of an enterprise using a corporate intranet to facilitate the carrying out of assessments and related activities, however, these embodiments are examples only. It cannot be over-emphasized that the invention has applicability to any type of operational risk assessment and control in any type or size of organization.

Some terms used throughout this description should be understood from the beginning. The term "permute" and similar terms such as "permuting" and "permutation" are being used in the statistical sense, and refer to the process or apparatus involved in determining all possible permutations of a selection of items. In at least some of the example embodiments disclosed, these items are failure modes, causes, and effects, which are related and can be associated in various ways to form a list of risk items. The term "organization" is typically being used to refer to a functional organization within a corporation or association that is making use of the risk assessment and management tools of the invention. This term could also, however, refer to an entire corporation, or a non-descript group within a larger organization. A "function" within an organization is a specific process or set of processes for which there is a desire to assess and control operational risks. For example, in a financial organization, the process of receiving and depositing cash receipts might be thought of as a function. A "failure mode" is any way in which a process, activity, or event which is related to an identified function, can fail to execute or complete successfully.

At various places within this disclosure, ratings and failure mode likelihoods are discussed. Ratings are numerical expressions of severity, likelihood of occurrence, and other attributes of causes and effects. Failure mode likelihoods are similar to ratings, but are applied to an entire failure mode, independent of specific causes and effects.

Finally, a "module" or "modules" is/are groups of related activities or processes connected with carrying out embodiments of the invention. For example, cause analysis activities can be thought of as being performed using, or with the aid of, a cause analysis module. Likewise, a calculation module is a module that is used for or that performs the permuting and other calculations based on ratings and likelihoods, and may also produce reports. These modules may be collections of related, human-performed activities which are performed with the aid of paper forms, or with the aid of computerized tools such as spreadsheets, or alternatively, these modules may be software applications or portions thereof which run on a computing platform or instruction execution system.

At some points in this disclosure, the concept of "quantifying" risk based on financial data is discussed. This terminology is meant to suggest the process of applying a financial cost to the occurrence of specific failure modes or risk items based on historical financial data. If risk quantification is included, for example, in a risk prioritization report, it can be assumed that at least in some embodiments, actual financial numbers can be attached to risk items. These numbers can be in dollars, pounds, or whatever the desired currency unit is for the place, time and personnel involved in performing risk assessment activities.

FIG. 1 is a block diagram of a system, 100, which implements example embodiments of the present invention. In FIG. 1, directional arrows identify the general flow of the processes of this embodiment of the invention, as well as the general flow of data between various modules and various data stores. These arrows are not intended to indicate exclusive flows. Rather, they are shown to illustrate the salient features of example embodiments of the invention. In a practical system, other data paths may exist. Module 102 is used to complete any needed prework prior to actually performing a risk assessment. Such prework includes the identification of a specific function or functions within an organization, and the identification of personnel to perform risk assessment. Typically, the identification of a function or functions is accomplished by a review of operational activities of the organization. This process may be aided by the identification of customers and beneficiaries, which may include internal or external persons or entities. Core functions identified as part of this process may or may not line up organizationally with a large organization or enterprise. In a typical embodiment, risk ownership is determined for each function. Thus, a person is identified to manage and control risks identified during the assessment process.

In some embodiments, it is desirable to identify subject matter experts (SME's) to prepare documentation, analyze work flows, and eventually, even provide ratings and likelihoods to be acquired as part of an assessment. Subject matter experts are persons who are skilled in the relevant business or process art. For example, if a financial function is to have an assessment performed, a subject matter expert (SME) might be a person with a financial or accounting background. It can be important in some applications to clearly define the scope of operational activities that will be covered, and will not be covered by assessment, prioritization, and mitigation activities. In some organizations, it may also be beneficial to identify customer segments and delivery partners. Functions may be recorded in tabular form, and may reference process diagrams and the like. In a computer based system, at least some of these items will be stored in data store 104, referred to herein as the operational risk assessment and control (ORAC) data store.

The three analysis modules shown in FIG. 1 are involved in identifying and assessing operational risk for each identified function. With the help of these analysis modules, risks are assessed in terms of severity of identified effects, likelihood of occurrence as a result of each identified cause, the effectiveness of current detection methods in place, and how well each potential effect is mitigated once an imminent failure has been detected. Failure mode analysis module 106 can be used or operated to identify one or more failure modes associated with a function in the organization. A failure mode is any way in which a particular event or activity that is critical to the delivery of the function fails to execute or complete successfully. For example, if the organization is a bank, failure modes might include a customer deposit not being credited to the appropriate account, a check image exception, or a customer transaction not being processed accurately. A failure mode occurs in time between a cause and effect. The cause triggers the failure mode, which in turn triggers the effect. The failure mode can describe the current state of the failure, while the effect describes the impact. The failure mode analysis module can make use of a worksheet, spreadsheet, or input screen to list failure modes. Such a worksheet or screen will be discussed later, as part of a general discussion of worksheets and input screens that might be used with embodiments of the present invention.

In some embodiments, each failure mode can be identified and failure mode likelihoods can be assigned to the failure mode. In some embodiments, one failure mode likelihood that can be assigned is a failure mode likelihood of occurrence (FM OCC). This likelihood of occurrence can be represented on a scale from 1 to 5. A failure mode occurrence likelihood of 1 indicates that the failure almost never happens. A failure mode occurrence likelihood of 2 indicates that the failure happens occasionally during the applicable event or activity, but not very often. A failure mode occurrence likelihood of 3 indicates that the failure happens with moderate frequency, but not more often than not. A failure mode occurrence likelihood of 4 indicates that the failure happens frequently, that is more times than not when the functional event or activity is performed. Finally, in these example embodiments, a failure mode occurrence likelihood of 5 indicates that the failure is almost inevitable, happens almost every time the functional event or activity is performed, typically at least 90 percent of the time.

In example embodiments, another failure mode likelihood which can be acquired for use in the risk assessment is a failure mode likelihood of detection (FM DET). In example embodiments, the failure mode detection likelihood is also on a scale from 1 to 5. A likelihood of 1 indicates that detection of the failure mode is almost certain. A likelihood of 2 indicates that there is a high chance of detecting the failure mode. A likelihood of 3 indicates that there is a moderate chance of detecting the failure mode. A likelihood of 4 indicates that there is a very low chance of detecting the failure mode. Finally, a likelihood of 5 means there is little or no chance of detecting the failure mode. As will be seen from the discussion below, in this embodiment, failure mode likelihoods are not used in the initial operational risk assessment process, but can be used for data validation, check points, and also to validate the results of an assessment during the analysis of a risk prioritization report.

Effects analysis module 108 is used or exercised in analyzing the effects associated with the failure mode. An effect is the impact the failure mode potentially has on the organization being assessed, or on the customers and/or delivery partners of a function. There can be several effects for each failure mode. In most cases, it is not practical to focus on every effect, and subject matter experts or others who are involved in a risk assessment will focus on the most critical effects. Identifying and characterizing the effects of a failure mode can be facilitated with the aid of a worksheet or input screen which is illustrated and discussed later in this disclosure. In example embodiments disclosed herein, each effect is given a severity rating (SEV) and a response rating (RESP). In some embodiments, each effect can also be flagged as a compliance concern, and/or as being related to a strategic planning item for the organization. These later ratings, in most embodiments, will consist of "yes" or "no" responses as opposed to numerical ratings. An effect is a compliance concern when it may impact an organization's ability to remain in compliance with regulatory or legal requirements. An effect may be related to a strategic planning item when it effects long-term, business goals of over-arching importance to the entire business, organization, or enterprise. A strategic planning flag can be used by those of ordinary skill in art implementing the invention to highlight any special concerns which should cause a risk item to be flagged for more in-depth analysis at a later time.

The numerical ratings for effects according to example embodiments of the invention are again set on a scale of 1 to 5. For the severity rating, effects that have no significant impact on business operations, customers, or partners, are assigned a severity rating of 1. Effects which prevent delivery partners or the organization involved in the assessment from fulfilling responsibilities with respect to the function involved, result in an almost certain loss of customers, or result in certain dissatisfaction with speed quality, accuracy or reliability, are given a severity rating of 5. Severity ratings of 2, 3, or 4 are assigned a higher or lower number to indicate increased or decreased severity relative to the above-described effects accordingly.

A response rating is a rating of how well the current response to a detected cause and/or failure event mitigates the potential effects that have been identified. Participants in the assessment will typically consider whether the organization's current response is adequate when the potential failure is detected. Again, the response rating is scaled on a numerical scale from 1 to 5, where a higher number tends to indicate problems with the response. A response rating of 1 indicates that the failure corrects itself or that the current response plan results in no impact. A response rating of 2 suggests that current plans allow a response to an effect to be such that the effect may be unnoticed by customers, beneficiaries, or delivery partners. A response rating of 3 suggests that the current response plan is such that effects will be somewhat minimized but still noticeable. A response rating of 4 indicates that a response plan exists, but the effect will still result in failure as perceived by customers, beneficiaries, partners, etc. A response rating of 5 suggests that no mitigation plan for the effect is in place, thus the full negative impact of the effect will be felt.

Returning to FIG. 1, cause analysis module 110 facilitates the analysis of causes of the failure modes previously identified. A "cause" is a trigger or reason for the relevant failure mode to occur. Causes can fall into many different categories. For example, people causes may involve hiring/firing practices, training/development practices, turnover, and the quality and experience of employees. Process causes can include inputs that do not meet requirements or specifications, process variability or lack of standards. Systems causes can include failure of technology, hardware, or software. Execution causes can include poorly conceived or managed projects, inadequate resource planning, inadequate management oversight, or attempting too many projects or initiatives within an organization. Regulatory causes can include a lack of knowledge, willful or non-willful non-compliance, or lack of guidance from regulatory bodies. Legal causes might be similar to regulatory causes, but can also include problems with interpretation of laws. External events, such as political, social, cultural, and environmental factors can also be causes. Negative perceptions of the organization or enterprise might be termed "reputation" causes.

Again, a cause worksheet or input screen or spreadsheet can be used during the operation of the cause analysis module, 110. In any case, in the example embodiments disclosed here, each cause is given an occurrence rating (OCC) and a detection rating (DET). The occurrence rating is the rating of a likelihood of occurrence of the corresponding failure mode, due to the identified cause. In example embodiments, subject matter experts or other personnel participating in the assessment can take into account two factors in coming up with the rating which is acquired by the system to perform the risk assessment and prioritization. One factor is how likely the failure is to occur overall. Another factor is how likely the failure is to occur due to the identified cause. In any case, the occurrence rating scale is again a scale of 1 to 5, with 1 indicating the most remote chance that the failure is likely to occur due to the identified cause. That is, the failure mode almost never happens, at least from that cause. An occurrence rating of 2 indicates that the failure happens every once in a while during the function or activity due to this cause. A failure mode of 3 indicates that the failure happens with moderate frequency, but not more often than not. An occurrence rating of 4 indicates that the failure happens all the time, typically more times than not due to this cause. Finally, an occurrence rating of 5 indicates that the failure is an almost inevitable response to the cause. Note that the occurrence rating will typically not be the same as the failure mode likelihood of occurrence, since it takes into account not only the overall likelihood of occurrence for the failure mode, but also the likelihood of occurrence for the failure mode from a specific, identified cause.

In example embodiments, the cause analysis implemented at module 110 also includes a detection rating. The detection (DET) is a rating of how likely a failure mode is to be detected when it occurs from the identified cause. Participants in a risk assessment can take into account both the likelihood of detection of the failure mode overall, and the likelihood of detection of the failure mode when it occurs from the identified cause. It may be that in some cases a failure mode is more likely to be detected if it is related to certain causes, as opposed to other causes. Subject matter experts or other participants who are determining a detection rating to be acquired as part of the assessment portion of the process can take into account the effectiveness of detection methods in terms of whether they reflect preventative vs. detective control, and the effectiveness of detection methods in terms of how often the identified cause of the failure is detected. As with the occurrence rating, the rating scale for the detection rating is the same 1 to 5 scale as that used for failure mode detection likelihood as previously discussed.

As can be seen from the arrows on FIG. 1, all of the analysis modules store collected ratings and likelihoods in the ORAC data store, 104. In some embodiments, failure modes, causes, and effects are permuted by calculation module 112. Thus, all combinations of a failure mode, its causes, and its effects are evaluated and arranged so that each viable combination is a risk item. Next, risk calculation module 114 performs calculations using the ratings acquired. These calculations are then used within calculation module 114 to produce a risk prioritization report which is output to management assessment review module 116, in which the prioritization report is reviewed and mitigation plans are put into place for the various risk items. These plans are reviewed by management at module 118, and a periodic review of mitigation activities is performed at module 120. As shown by feedback loop 122, this process can be repeated as changes occur impacting risk. Thus a continuous loop of assessment, analysis, mitigation, and review can be established within an organization.

Note that calculation module 114 can also output to a stability analysis module, 123. Stability analysis allows risks to be compared across functions and/or at different points in time based on what might be termed "operational stability." Stability is represented by a ratio of the number of risk items that are not considered priorities (non-priority risk items) to the total number of risk items. Conversely instability can be represented by the ratio of the number of the risk items in an analysis that are considered priorities (priority risk items) to the total number of risk items. Either of these measures might be referred to herein as a stability ratio. In a typical embodiment of the invention, the risk items that are considered priorities are the risk items that are specifically selected for inclusion in a prioritization report based on certain criteria, as is discussed below with respect to FIGS. 3 and 4. These stability ratios can allow the comparison of risks between different areas, functions, organizations, etc. The ratios can be aggregated up or down in an organizational hierarchy or across connected processes to reflect combinations of risks.

Stability can be used to characterize risk over time. For example, a stability ratio, expressed as a percentage of 90% would be an improvement over a previous stability ratio of 75% because it would mean a smaller, relative number of risk items are priority items than were priority items previously. For purposes of this disclosure, the tracking of a stability ratio either across organizations, by aggregation with other stability ratios, or over time can be referred to as "tracking" the stability ratio.

As previously mentioned, the system of FIG. 1 can include a risk data validation module 124, which validates likelihoods and ratings acquired during the analysis process. This validation can be conducted by checking ratings against data stores such as data store 126, which includes historical information on problem management within the organization, and/or data store 128, which includes data on the handling of audit and regulatory issues either within an organization or more generally. Such a data store might be commonly available in organizations which operate in highly regulated industries, such as banking, energy, securities, etc. A risk data quantification module, 130, can also be included. This module can access data in financial data store 132, which includes information on costs of various failures and effects. Thus, prioritization reports produced by calculation modules 112 and 114 can include financial figures. Quantification can also be applied to stability reports.

FIG. 1 also illustrates connections to other systems, 134, which may include systems containing information about risks other than operational risks. For example, risks of financial loss due to business volatility, and of criminal activity, may be characterized elsewhere in an organization or enterprise. Connecting the operational risk assessment system to such other systems may enable all of the risks for the organization or enterprise to be included in a single model.

Figure 2:
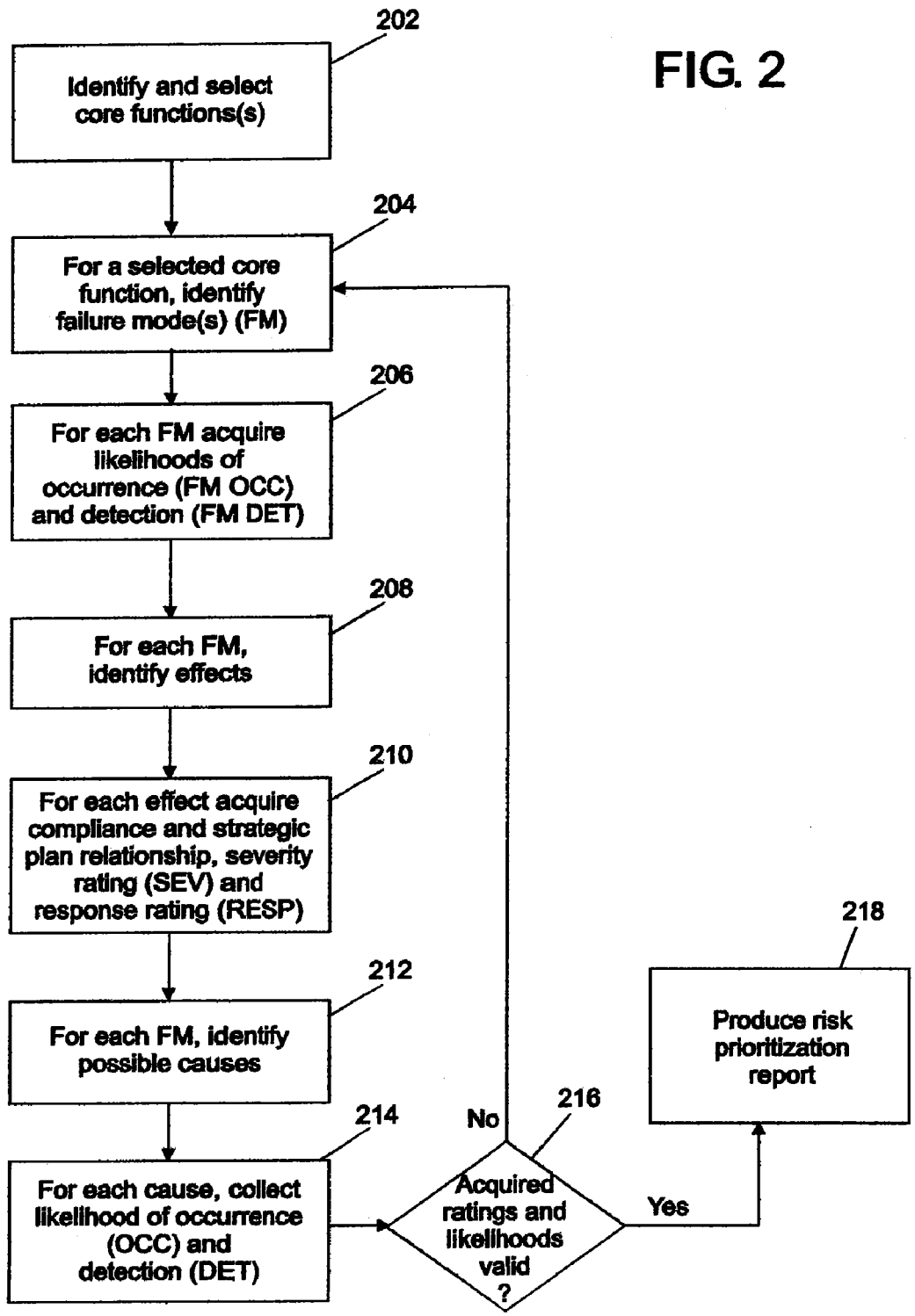
FIG. 2 is a high level flowchart that illustrates at least a portion of a method according to some embodiments of the invention.

FIG. 2 is a flowchart which illustrates the process of acquiring likelihoods, ratings, and other information, and using such data to produce a risk prioritization report according to some embodiments of the invention. FIG. 2 illustrates the process in typical flowchart fashion, with process blocks showing the various actions which occur as part of the process. Process 200 begins with block 202 where functions to be assessed are identified and selected. In some embodiments, these functions can be "core" functions, as it will often not be desirable to try to identify every function in an organization. At block 204, failure modes for a selected function are identified. At block 206, failure mode likelihoods are acquired. As previously described, these likelihoods include a failure mode, a failure mode occurrence likelihood and a failure mode detection likelihood. At block 208, effects for each failure mode are identified. At block 210, ratings are identified for each effect. These ratings can include a strategic plan relationship, compliance relationship, a severity rating, and a response rating, as previously discussed. At block 212, causes are identified for each failure mode. At block 214, for each cause, ratings are acquired. These ratings can include a likelihood of occurrence, and a likelihood of detection, as previously discussed.

At block 216, in this example embodiment, the acquired ratings and likelihoods are validated. If any of the data collected thus far is or may be invalid, processing returns to block, 204 and the process is repeated. Validation of acquired ratings and likelihoods at block 216 can take any of various forms. In one example, ratings and likelihoods are validated by a data validation module, which validates the ratings and likelihoods against historical data as previously discuss. Validation can also be performed using failure mode likelihoods as a checkpoint. For example a failure mode likelihood of occurrence can be multiplied by each effect severity. The result of this multiplication is referred to as a failure mode "criticality." If a large number of risk items have a criticality of 10 or below, it may be desirable to repeat the assessment with tighter controls on how likelihoods and ratings are determined. In the case of failure mode likelihood of detection, this can be compared in a similar fashion with likelihood of detection taking a specific cause into consideration. The failure mode likelihood of detection can be multiplied by the severity rating for a given risk item for a comparison. Finally, if the risk data is validated at block 216, the risk prioritization report is produced at block 218. The risk prioritization report lists risk items resulting from permutations or failure modes, causes, and effects. Ratings associated with the causes and effects are then associated with each risk item.

Figure 3:
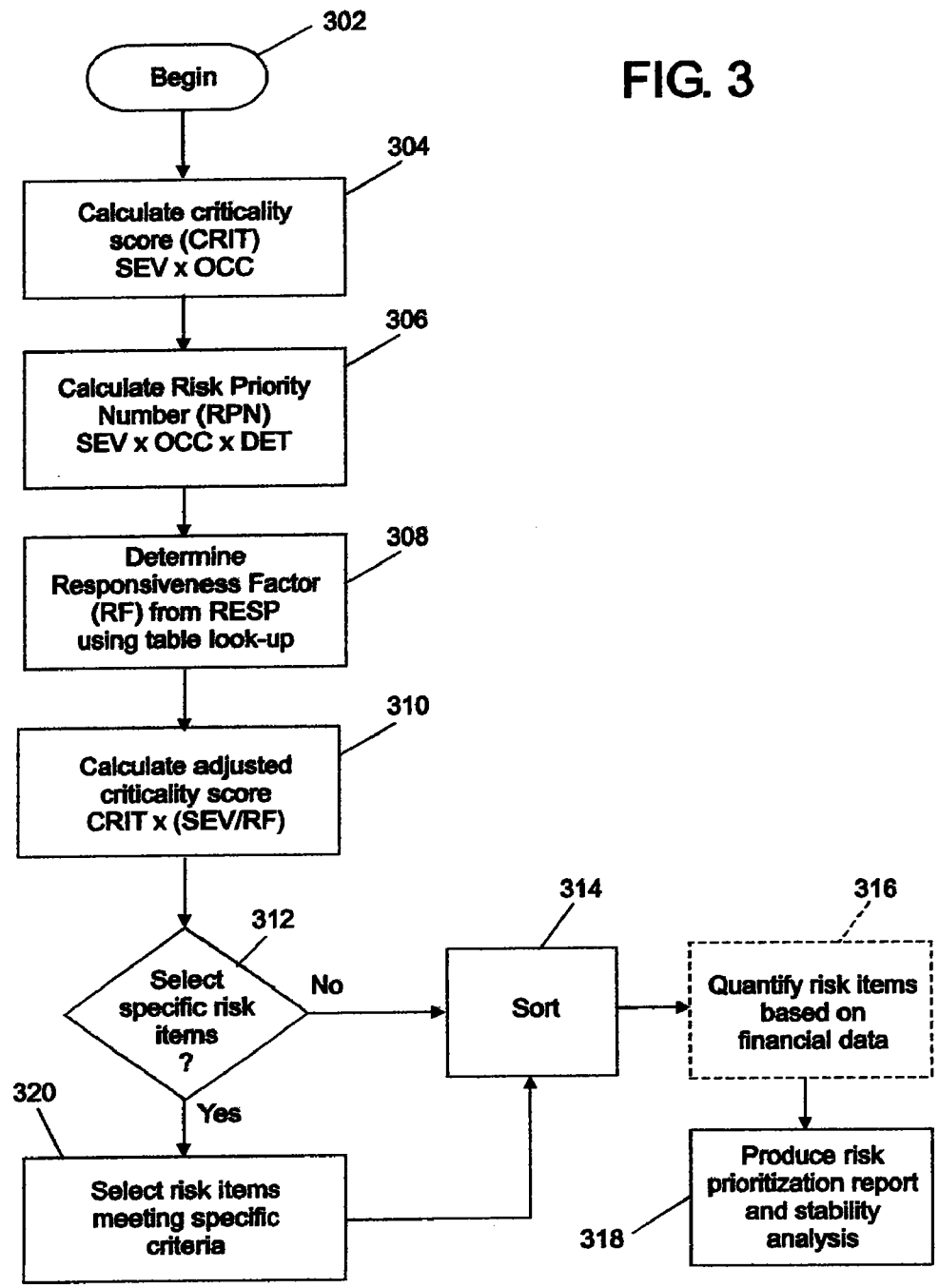
FIG. 3 is a more detailed flowchart which illustrates a portion of a more specific process of the method illustrated in FIG. 2.

FIG. 3 is a flowchart illustrating further detail of the production of the risk prioritization report by calculation modules in the system of FIG. 1. Process 300 begins at block 302. At block 304, the "criticality" for a risk item is calculated. The criticality is defined as the severity rating (SEV) associated with the risk item multiplied by the likelihood of occurrence (OCC) associated with the risk item. At block 306, a risk priority number (RPN) is calculated. THE RPN is defined as the severity rating (SEV) associated with the risk item multiplied by the likelihood of occurrence (OCC), multiplied by the likelihood of detection (DET), all for the risk item involved. At block 308 a responsiveness factor is determined. This responsiveness factor is essentially an inverse of the response rating for a risk item. The responsiveness factor (RF) for a risk item with a response rating of 5 is 1. The responsiveness factor for an item with a response rating of 4 is 2. The responsiveness factor for an item with a response rating of 3 is 3. The responsiveness factor for an item with a response rating of 2 is 4. Finally, the responsiveness factor for an item with a response rating of 1 is 5. These mappings can be included in a table and the determination of responsiveness factor can be made by a table look-up.

At block 310 of FIG. 3 an adjusted criticality score is calculated. The adjusted criticality score is the previously calculated criticality score (CRIT) multiplied by the ratio of the severity rating (SEV) divided by the responsiveness factor (RF) for a given risk item. Optionally, a check is made at block 312 to determine if there is a desire to select specific risk items for consideration, that is, for inclusion in the prioritization report. If not, risk items are optionally sorted at block 314. This sort can be conducted according to the criticality, the RPN, or the adjusted criticality, according to the wishes of a user of a system according to the invention. Optionally, at block 316, risk items are quantified based on financial data as previously discussed. At block 318, the actual risk prioritization report is produced for analysis by management. Reports produced may optionally include stability analysis reports based on stability ratios as previously discussed.

Figure 4:
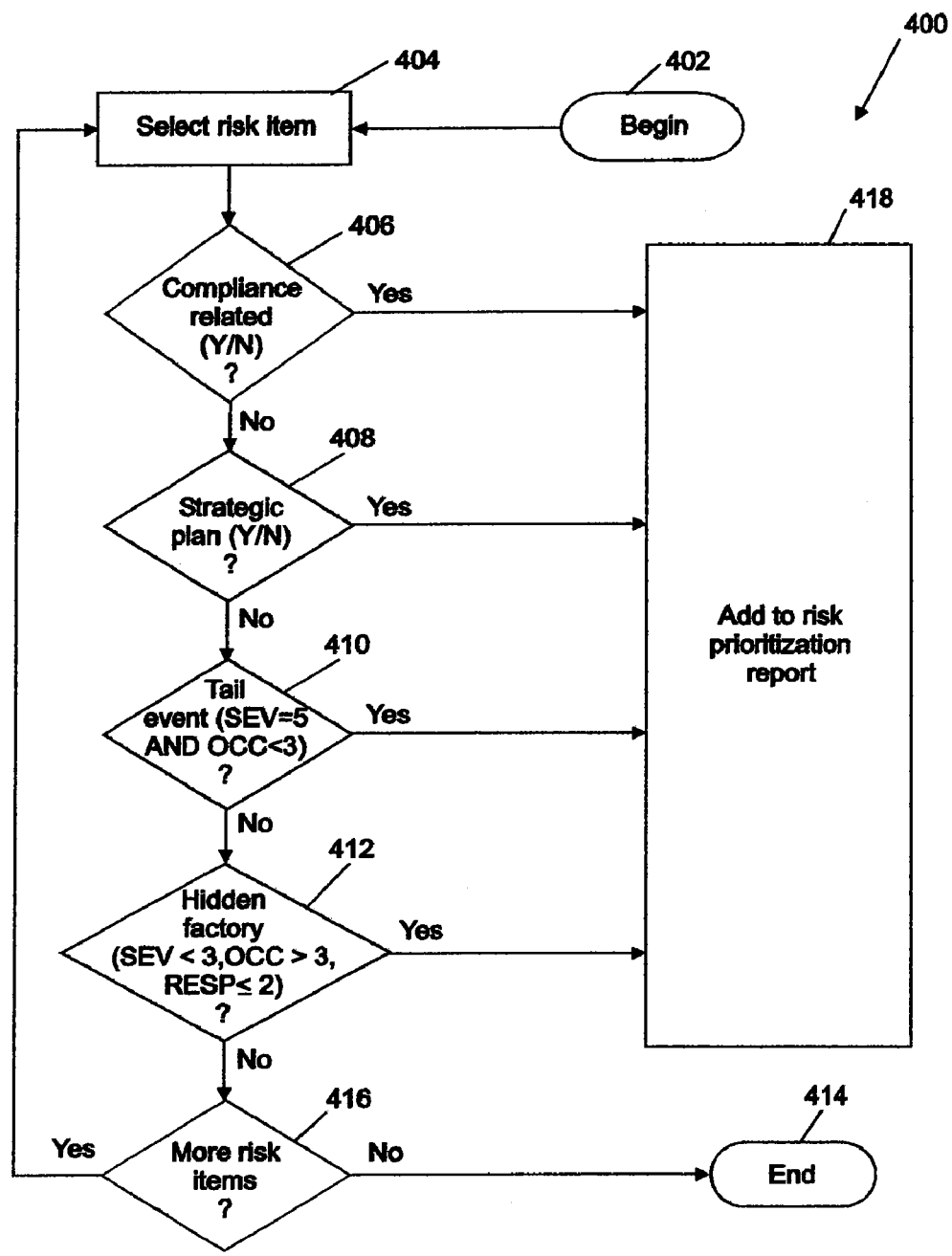
FIG. 4 is another more detailed flowchart which illustrates a portion of the method illustrated in FIG. 2 according to some embodiments of the invention.

Note that if a choice is made to select specific risk items at block 312, this selection is accomplished at block 320. FIG. 4 illustrates a flow chart, which describes possible ways in which the risk items can be selected for inclusion in the prioritization report in one example embodiment. In a computerized implementation of the invention, these options can be selected from a menu or similar screen by a user of the computer system which is providing the risk assessment tools. Process 400 begins at block 402. Risk items are selected for processing at block 404. Each one is filtered according to various criteria, which are represented by decision blocks 406, 408, 410, and 412. If there are no more risk items to test via the various filtering factors, the process ends at block 414. Otherwise, if more risk items are present at block 416, processing returns to block 404 and a risk item is tested against all the various criteria again. At 406 a determination is made as to whether the risk item represents a compliance concern. If yes, it is automatically included in the risk prioritization report. At block 408 a determination is made as to whether the risk item is related to a strategic plan. If yes, that item is automatically added to the risk prioritization report.

At block 410 of FIG. 4, a determination is made as to whether an item represents a "tail event" which is a term that is understood by those in the quality control arts. In the context of the present system, a tail event is an event that has high severity, but will not occur very often. In some organizations, tail events represent higher risks than would otherwise be apparent from numerical ratings and likelihoods. In this example embodiment, a risk item with a severity rating of 5 and a likelihood of occurrence of less than 3 represents a tail event, and is automatically added to the prioritization report. Block 412 tests risk items to see whether they represent a "hidden factory" as is understood by those in the quality control arts. A hidden factory is a reference to rework that occurs to correct certain kinds of repetitive errors in an organization. In this example embodiment, an item represents a hidden factory if it has a severity rating of less than 3, a likelihood of occurrence rating of greater than 3, and a response rating less than or equal to 2. A risk item that meets all these criteria is considered to represent a hidden factory and is automatically included in the risk prioritization report. Items which are flagged for automatic inclusion in the report are added to the report at block 418. The risk prioritization report according to these example embodiments, may or may not be produced with additional sorting after selections has been applied. It is important to note that with respect to all methods and processes described throughout this disclosure, the various steps shown may be performed in any order, unless a specific order is described, or is evidently necessary based on the logical relationship of the steps. Also, the calculation and ratings systems presented herein are given as examples only. The method and system of the invention can be implemented using ratings based on different numerical scales, for example, percentages, and the calculations and reporting thresholds modified accordingly.

Figure 7:
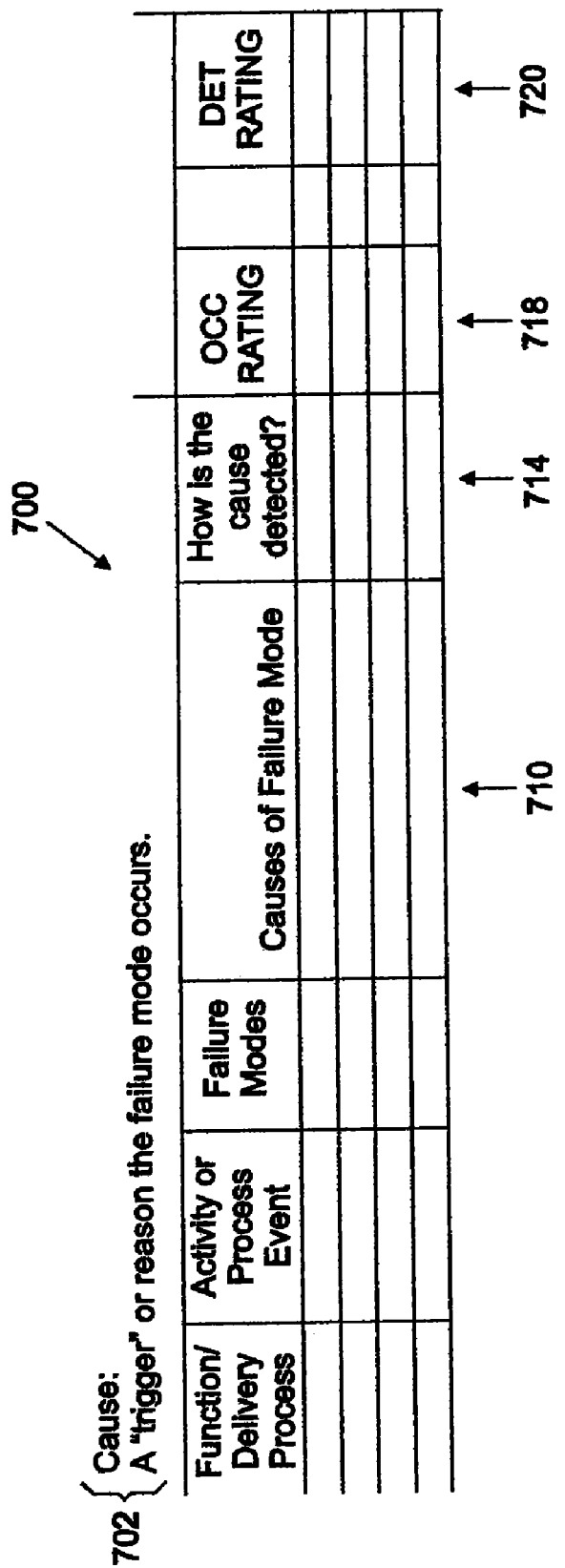
FIG. 7 illustrates a cause worksheet or entry form according to some embodiments of the present invention.

FIGS. 5, 6, and 7 illustrate various worksheets, which can be used to implement embodiments of the invention. Specifically, these worksheets are used in the analysis modules that have been previously discussed. In a practical implementation, a worksheet can be a paper form, a spreadsheet, or an input screen for a computer implemented embodiment based on spreadsheets, java applets executed on a client in communication with a server, or the like. FIG. 5 is a failure mode worksheet. Failure mode worksheet 500 includes a header 502 which defines a failure mode. Each row is used to characterize one failure mode. Column 504 is where the organization involved is listed for each failure mode. Column 506 is provided to list the function, or process, to which the failure mode applies. Column 508, optional, allows a failure mode to be keyed to a specific sub-process, event, or activity within the function or process listed in column 506. Each failure mode is specified in column 510. Finally, overall failure mode likelihoods of occurrence (FM OCC) and overall failure mode likelihoods of detection (FM DET) are specified in columns 512 and 514, respectively.

FIG. 6 illustrates an effects worksheet, 600. The effects worksheet is explained in header 602. One effect is listed per line of the effects worksheet. In the example effects worksheet shown in FIG. 6, column 604 is for specifying the function or process involved. Failure modes are listed in column 606. Again, column 608 is provided to optionally identify sub-processes or activities to which failure modes, and hence effects, apply. The effects themselves are listed in column 610. The remainder of the effects worksheet is dedicated to acquiring the various ratings associated with the effects. Whether the effect is a compliance concern is indicated in column 612. Column 614 can be provided to show which laws or regulations are involved. Entries in column 616 can indicate whether the effect is related to a strategic plan. Finally, numerical severity ratings (SEV) and response ratings (RESP) can be listed in columns 618 and 620, respectively.

FIG. 7 illustrates a sample cause worksheet. Again, header 702 of worksheet 700 explains the worksheet. Causes are listed one item per line. The first three columns of worksheet 700 are the same as the first three columns of the previous worksheet example and will not be described further. Causes are listed in column 710. Column 714 can be included so that detailed detection information can be recorded. Finally, likelihood of occurrence ratings (OCC) and likelihood of detection ratings (DET) for each cause can be acquired in columns 718 and 720, respectively.

FIG. 8 illustrates one possible format of a risk prioritization report, 800, according to example embodiments of the invention. Each line item in such a report represents a risk item. Each line item also represents a permutation of failure modes, causes and effects. Functions are identified in column 802. The process involved in the specific risk item is identified in column 804. The failure mode is identified in column 806. The effect is identified in column 808, and the cause is identified in column 810. Controls already in place can be listed in column 812. These can be received as input into optional columns in worksheets previously discussed are listed in column 812. Note that since each line item can be a permutation of failure mode, effect, and cause combinations, a failure mode will typically be repeated multiple times. Causes and effects will also typically be repeated. Columns 814 of a risk prioritization report according to the example of FIG. 8 will list some of the ratings as shown, and also the calculated values for RPN, criticality, and adjusted criticality. As previously discussed, risk items might possibly be sorted according to one or more of these ratings and/or calculated values. It is also possible to include failure mode likelihoods in the report for validation purposes.

Figure 9:
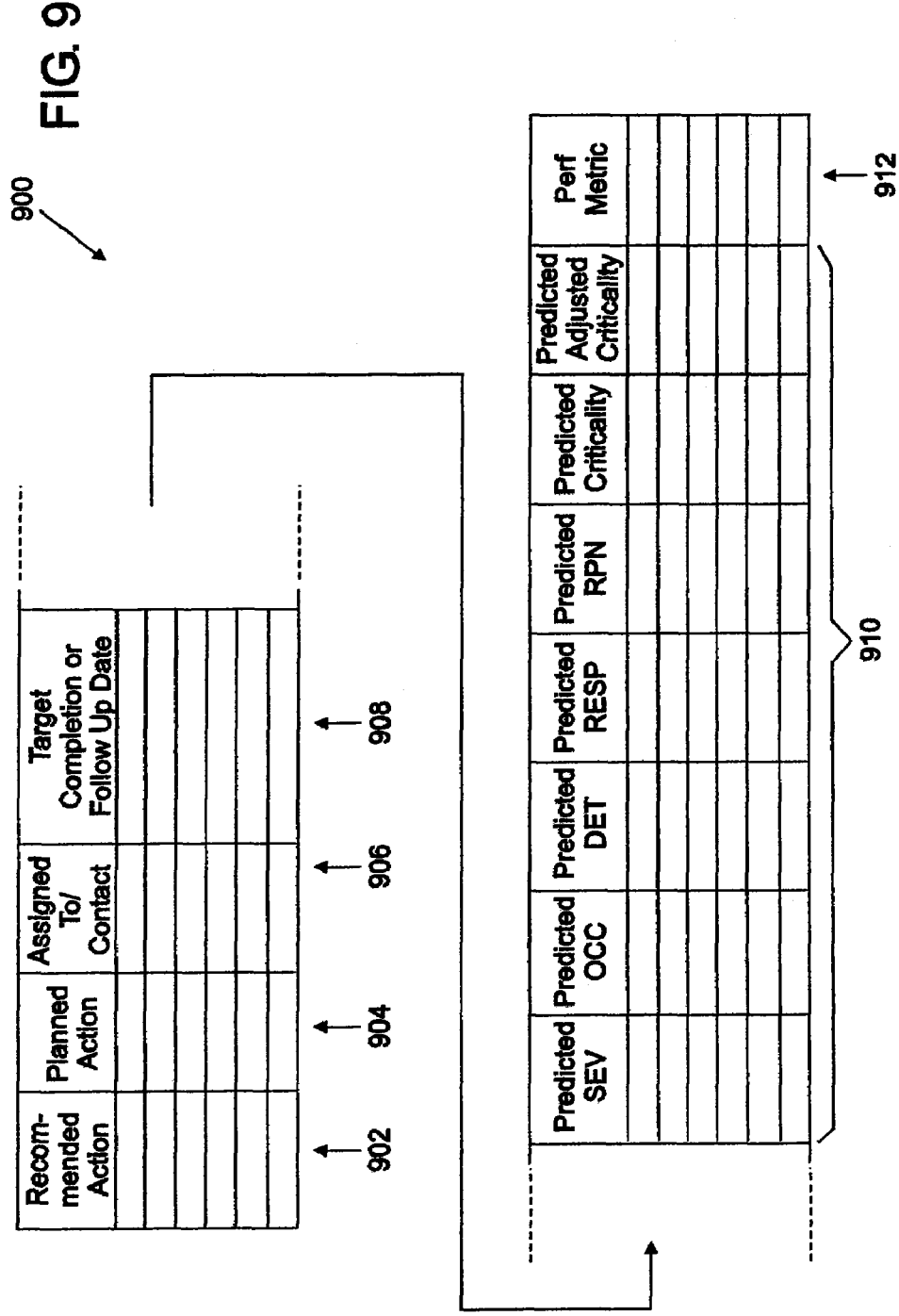
FIG. 9 illustrates a corrective action plan template, form, or report which is used in mitigation planning and tracking according to some embodiments of the present invention.

FIG. 9 illustrates a portion, 900, of a worksheet, which can be used in mitigation, planning and monitoring activities for operational risk control. FIG. 9 shows recommended actions in column 902, which can be used to mitigate and/or control a risk item. A portion of a worksheet as shown in FIG. 9 can be filled in for each risk item. Planned actions corresponding to each recommended action are shown in column 904. A contact person for the action can be listed in column 906. A target date for follow up or completion can be listed in column 908. Columns 910 are provided to list predicted ratings and resulting calculated values, which will occur for the subject risk item if a given planned action is completed. These columns correspond to columns which were listed in the example prioritization report of FIG. 8. Finally, column 912 is provided to list a performance metric which can be used to gauge the performance of the planned action. Such a performance metric may be established in order to obviate the need to do a complete risk assessment to determine the effectiveness of each action.

Figure 10:
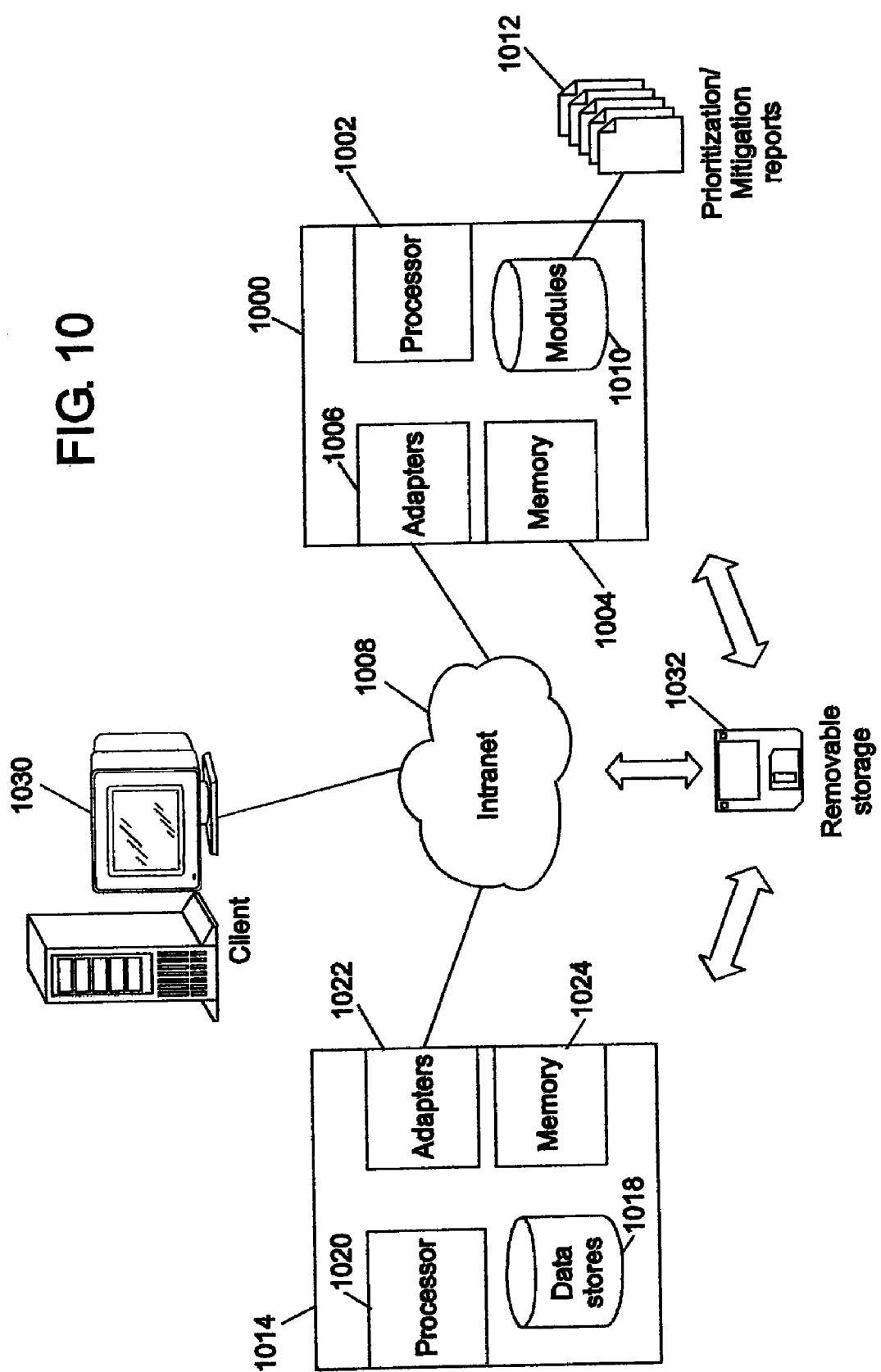
FIG. 10 shows one example of how the modules and data stores, which can be used to implement embodiments of the invention, are interconnected and organized in an example where the invention is implemented by computerized means.

FIG. 10 illustrates, in block diagram form, a view of some of the hardware involved in carrying out an example computer implemented embodiment of the invention. FIG. 10 shows an implementation that makes use of a network. This network is typically an internal corporate network, and can be an "intranet" which can allow the use of "java" and similar scripting tools to provide for worksheets and forms. The system of FIG. 10 includes a computing platform 1000. The platform is controlled by a processor, 1002, which serves as the central processing unit (CPU) for the platform. Memory 1004 is typically divided into multiple types of memory or memory areas such as read only memory (ROM), and random access memory (RAM). A plurality of general purpose adapters 1006 are present. At least one, in this example, serves to connect the computing platform to network 1008. Computer program code instructions for implementing the appropriate modules are stored on the fixed disk 1010. Prioritization and mitigation tracking reports, 1012, are produced by the modules as previously discussed. When the system is operating, the instructions for the modules are at least partially loaded into memory and executed by the CPU. Numerous types of general purpose computer systems, workstations, and servers are available and can be used to implement computing platform 1000. Available systems include those that run operating systems such as Windows™ by Microsoft, various versions of UNIX™ (including Apple Computer's Mac™ OS X), and various versions of LINUX.

It should be noted that the entire function of the invention, including the data stores, can be implemented in whole or in part on a single computing platform like that shown in FIG. 10. This might be the case, for example, if a small business were to make use of the invention on a stand-alone personal computer or workstation. In other embodiments, however, the data stores can be maintained on a server as shown at 1014 of FIG. 10. In this case, fixed disk storage, 1018, contains the data stores. Processor 1020, adapters 1022, and memory 1024 function similarly to those of computing platform 1000. In the case of a corporate intranet being used for connectivity, modules on computing platform 1000 can be accessed from client workstation 1030, via a web interface.

A computer program which implements all or parts of the invention through the use of a system like that illustrated in FIG. 10 can take the form of a computer program product residing on a computer usable or computer readable storage medium. One example of such a medium is a diskette, is shown at 1032 in FIG. 10. A computer program product containing the program of instructions can be supplied in such a form, and loaded on the machines involved, either directly, or over a network. The medium may also be a stream of information being retrieved when the computer program product is "downloaded" through the Internet or an intranet. The computer programs can reside on any medium that can contain, store, communicate, propagate, or transport the program for use by or in connection with an instruction execution system, apparatus, or device. The computer usable or computer readable medium may be, for example, but not limited to, an electronic, magnetic, optical, electromagnetic, infrared or semiconductor system, or a propagation medium. Note that in a computer implemented embodiment of the invention, the computer usable or computer readable medium can even be paper or another suitable medium on which the program instructions are printed. In this case, the program could be electronically captured via optical scanning of the paper or other medium, then processed in a suitable manner.

FIG. 11 illustrates how the risk assessment and control features of embodiments of the invention thus far described can be used to create a risk meta-model for an enterprise. Such modeling can be provided by other systems within the enterprise, and the risk assessment systems discussed thus far can include an operational link to a meta-modeling system within the integration path illustrated at 134 of FIG. 1. A risk meta model is a standardized set of risk entities and attributes that define a risk taxonomy for an enterprise. Such a risk meta-model provides a common data store and data linkages for risk related information for an entire enterprise. It can support cross-organizational, enterprise-wide views and analyses of existing risks. A risk meta-model can also facilitate assessment of contemplated changes and monitor actual impact of implemented changes. In FIG. 11, risk meta model 1100 provides output 1102 for an enterprise. Output 1102 can include multi-dimensional analysis and reporting for the enterprise, recommended organizations within the enterprise, strategic risk management, and operational risk management and/or control. Output 1102 can be scaled and can be modular. Such a system can leverage subject matter expert topical knowledge and obviate the need to understand all of the various business areas to understand how risks affect a business as a whole. The meta-model can be extensible and compatible with existing technologies and implemented via the web, java, and even extensible mark-up language (XML). Mitigation, scoring, prioritization and tracking can be provided.

Meta model 1100 of FIG. 11 includes as input risk assessment information from various organizations, which may be gathered according to the methods and systems previously described in this disclosure. These inputs, 1104, are fed into adapters, 1106, which translate and link organization risk data for use in risk meta-model 1100. Risk meta-model 1100 also includes as input risk information related to various regulatory schemes and industry standards, 1108, such as those related to legislation in the United States commonly referred to as Sorbanes-Oxley, or the USA Patriot Act, or to industry standards such as Basel II, and others. Adapters 1110 serve to translate and link industry data regarding these regulatory and standards risks for use in meta-model 1100. The form and operation of the meta-model is determined by strategic risk management 1112. Risk management also receives feedback from the risk meta-model. Reporting and tracking output from the risk meta model can be fed back into the risk assessment process of various organizations to produce a continuous improvement cycle as shown at 1114.

Specific embodiments of an invention are described herein. One of ordinary skill in the computing and management arts will quickly recognize that the invention has other applications in other environments. In fact, many embodiments and implementations are possible. The following claims are in no way intended to limit the scope of the invention to specific embodiments described above.

The invention claimed is:

1. A method of managing operational risk for an organization, the method comprising:
    identifying at least one failure mode for a function of the organization;
    identifying at least one cause and at least one effect for at least one of the at least one failure mode;
    acquiring ratings associated with the at least one cause and the at least one effect;
    permuting the at least one failure mode, the at least one cause, and the at least one effect to define at least two risk items; and
    producing a risk prioritization report of the at least two risk items based at least in part on the ratings associated with the at least one cause and the at least one effect, the ratings comprising:
        a severity rating and a response rating associated with each of the at least one effect; and
        an occurrence rating and a detection rating associated with each of the at least one cause; and
    wherein the acquiring permuting and producing steps are performed by a computer; and
    wherein the producing of the risk prioritization report comprises:
        calculating a criticality based on the severity rating and the occurrence rating;
        calculating a risk priority number based on the severity rating, the occurrence rating and the detection rating; and
        calculating an adjusted criticality based on the criticality, the severity rating, and the response rating,
        wherein the calculating steps are performed by a computer.

2. The method of claim 1 further comprising:
    recording a mitigation plan associated with at least one of the at least two risk items in the risk prioritization report; and
    tracking implementation of the mitigation plan.

3. The method of claim 2 further comprising:
    acquiring failure mode likelihoods associated with the at least one failure mode for the function; and
    validating the ratings using the failure mode likelihoods.

4. The method of claim 2 wherein the method further comprises determining a stability ratio, wherein the stability ratio represents a comparison of one of a number of priority risk items and a number of non-priority risk items to a total number of risk items and the tracking of the implementation of the mitigation plan further comprises tracking a stability ratio.

5. The method of claim 1 further comprising:
    determining whether the at least one effect is related to at least one of a group consisting of compliance and strategic planning;
    wherein the producing of the risk prioritization report further comprises determining whether each of the at least two risk items represents at least one of a group consisting of a compliance related risk, a strategic planning related risk, a hidden factory, and a tail event.

6. The method of claim 5 wherein the producing of the risk prioritization report further comprises quantifying at least some of the risk items based on financial data.

7. The method of claim 1 further comprising:
acquiring failure mode likelihoods associated with the at least one failure mode for the function; and
validating the ratings using the failure mode likelihoods.

8. The method of claim 1 further comprising validating the ratings using historical data.

9. The method of claim 1 wherein the producing of the risk prioritization report further comprises quantifying at least some of the risk items based on financial data.

10. The method of claim 1 further comprising determining a stability ratio, wherein the stability ratio represents a comparison of one of a number of priority risk items and a number of non-priority risk items to a total number of risk items.

11. A computer program product comprising a computer readable medium with a computer program embodied therein for facilitating risk assessment and control for an organization, the computer program comprising:
instructions for identifying failure modes for at least one function of the organization;
instructions for identifying at least one cause and at least one effect for each failure mode;
instructions for acquiring ratings associated with the at least one cause and the at least one effect;
instructions for permuting the failure modes, the at least one cause, and the at least one effect to define risk items; and
instructions for producing a risk prioritization report of the risk items based at least in part on the ratings associated with the at least one cause and the at least one effect for each failure mode, the ratings comprising:
a severity rating and a response rating associated with each of the at least one effect; and
an occurrence rating and a detection rating associated with each of the at least one cause, and
wherein the instructions for producing the risk prioritization report comprises:
instructions for calculating a criticality based on the severity rating and the occurrence rating;
instructions for calculating a risk priority number based on the severity rating, the occurrence rating and the detection rating; and
instructions for calculating an adjusted criticality based on the criticality, the severity rating, and the response rating.

12. The computer program product of claim 11 wherein the computer program further comprises:
instructions for recording a mitigation plan associated with at least one of the risk items in the risk prioritization report; and
instructions for tracking implementation of the mitigation plan.

13. The computer program product of claim 12 wherein the computer program further comprises:
instructions for acquiring failure mode likelihoods associated with the at least one failure mode for the function; and
instructions for validating the ratings using the failure mode likelihoods.

14. The computer program product of claim 12 wherein the computer program further comprises instructions for determining a stability ratio, wherein the stability ratio represents a comparison of one of a number of priority risk items and a number of non-priority risk items to a total number of risk items and the instructions for tracking the implementation of the mitigation plan further comprise instructions for tracking a stability ratio.

15. The computer program product of claim 11 wherein the computer program further comprises:
instructions for determining whether the at least one effect is related to at least one of a group consisting of compliance and strategic planning;
wherein the instructions for producing of the risk prioritization report further comprise instructions for determining whether each of the risk items represents at least one of a group consisting of a compliance related risk, a strategic planning related risk, a hidden factory, and a tail event.

16. The computer program product of claim 15 wherein the instructions for producing the risk prioritization report further comprise instructions for quantifying at least some of the risk items based on financial data.

17. The computer program product of claim 11 wherein the computer program further comprises:
instructions for acquiring failure mode likelihoods associated with the at least one failure mode for the function; and
instructions for validating the ratings using the failure mode likelihoods.

18. The computer program product of claim 11 wherein the computer program further comprises instructions for validating the ratings using historical data.

19. The computer program product of claim 11 wherein the instructions for producing the risk prioritization report further comprise instructions for quantifying at least some of the risk items based on financial data.

20. The computer program product of claim 11 wherein the computer program further comprises instructions for determining a stability ratio, wherein the stability ratio represents a comparison of one of a number of priority risk items and a number of non-priority risk items to a total number of risk items.

21. Apparatus for facilitating risk management for an organization, the apparatus comprising:
a computing platform;
means for identifying failure modes for at least one function of the organization;
means for identifying at least one cause and at least one effect for each failure mode;
means for acquiring ratings associated with the at least one cause and the at least one effect;
means for permuting the failure modes, the at least one cause, and the at least one effect to define risk items; and
means for producing a risk prioritization report of the risk items based at least in part on the ratings associated with the at least one cause and the at least one effect for each failure mode, the ratings comprising:
a severity rating and a response rating associated with each of the at least one effect; and
an occurrence rating and a detection rating associated with each of the at least one cause; and
wherein the means for producing the risk prioritization report comprises:
means for calculating a criticality based on the severity rating and the occurrence rating;
means for calculating a risk priority number based on the severity rating the occurrence rating and the detection rating; and means for calculating an adjusted criticality based on the criticality, the severity rating, and the response rating.

22. The apparatus of claim 21 further comprising:
means for recording a mitigation plan associated with at least one of the risk items in the risk prioritization report; and
means for tracking implementation of the mitigation plan.

23. The apparatus of claim 22 further comprising:
means for acquiring failure mode likelihoods associated with the at least one failure mode for the function; and
means for validating the ratings using the failure mode likelihoods.

24. The apparatus of claim 23 further comprising means for validating the ratings using historical data.

25. The apparatus of claim 22 further comprising means for validating the ratings using historical data.

26. The apparatus of claim 21 further comprising:
means for acquiring failure mode likelihoods associated with the at least one failure mode for the function; and
means for validating the ratings using the failure mode likelihoods.

27. The apparatus of claim 26 further comprising means for validating the ratings using historical data.

28. The apparatus of claim 21 further comprising means for validating the ratings using historical data.

29. The apparatus of claim 21 further comprising means for determining a stability ratio, wherein the stability ratio represents a comparison of one of a number of priority risk items and a number of non-priority risk items to a total number of risk items.

30. A system for facilitating risk assessment and control for an organization comprising:
a computing platform having computer program code embodied therein, the computer program code comprising:
at least one analysis module to identify causes and effects associated with failure modes of at least one function of the organization and acquire ratings associated with the causes and effects;
at least one data store operationally connected to at least some of the at least one analysis module to store failure modes, causes, effects, and ratings; and
at least one calculation module operationally connected to the at least one data store to permute the failure modes, causes and effect to define risk items and produce a risk prioritization report of the risk items based at least in part on the ratings, wherein the ratings comprise:
a severity rating and a response rating associated with each effect; and
an occurrence rating and a detection rating associated with each cause, and
wherein the at least one calculation module is operable to calculate a criticality based on the severity rating and the occurrence rating, a risk priority number based on the severity rating, the occurrence rating and the detection rating, and an adjusted criticality based on the criticality, the severity rating, and the response rating.

31. The system of claim 30 wherein the at least one calculation module is operable to determine whether each of the risk items represents at least one of a group consisting of a compliance related risk, a strategic planning related risk, a hidden factory, and a tail event.

32. The system of claim 31 further comprising a data validation module operationally connected to the at least one data store, the data validation module operable to validate ratings at least in part using historical data.

33. The system of claim 31 further comprising a risk data quantification module operationally connected to the at least one data store, the risk data quantification module operable to quantify ratings based at least in part on financial data.

34. The system of claim 30 further comprising a data validation module operationally connected to the at least one data store, the data validation module operable to validate ratings at least in part using historical data.

35. The system of claim 34 further comprising an operational interface to a risk meta-modeling system.

36. The system of claim 30 further comprising a risk data quantification module operationally connected to the at least one data store, the risk data quantification module operable to quantify ratings based at least in part on financial data.

37. The system of claim 36 further comprising an operational interface to a risk meta-modeling system.

38. The system of claim 30 further comprising an operational interface to a risk meta-modeling system.

39. The system of claim 30 further comprising a stability analysis module operationally connected to the at least one calculation module to determine a stability ratio, wherein the stability ratio represents a comparison of one of a number of priority risk items and a number of non-priority risk items to a total number of risk items.

* * * * *

UNITED STATES PATENT AND TRADEMARK OFFICE
CERTIFICATE OF CORRECTION

PATENT NO. : 7,593,859 B1  Page 1 of 1
APPLICATION NO. : 10/605551
DATED : September 22, 2009
INVENTOR(S) : Owens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1628 days.

Signed and Sealed this

Fourteenth Day of December, 2010

David J. Kappos
*Director of the United States Patent and Trademark Office*